Figure 1:
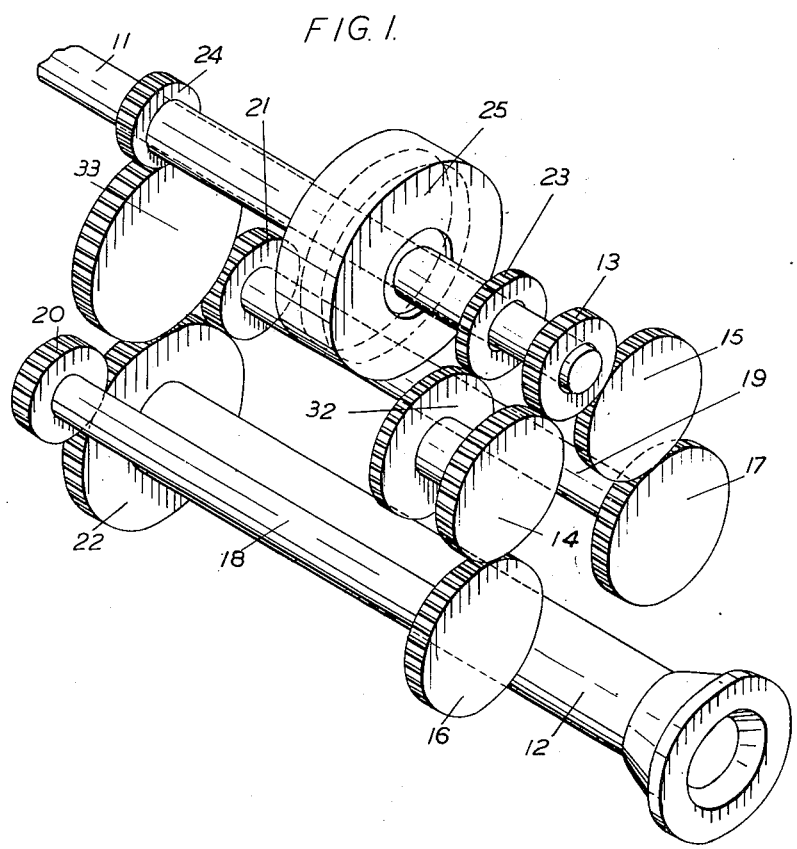

Feb. 26, 1952 B. W. BARLOW ET AL 2,587,431
POWER TRANSMISSION GEARING
Filed June 12, 1950 4 Sheets-Sheet 1

Inventors
Benjamin W. Barlow
George H. Murray
By
Emery, Holcombe & Blair
Attorney

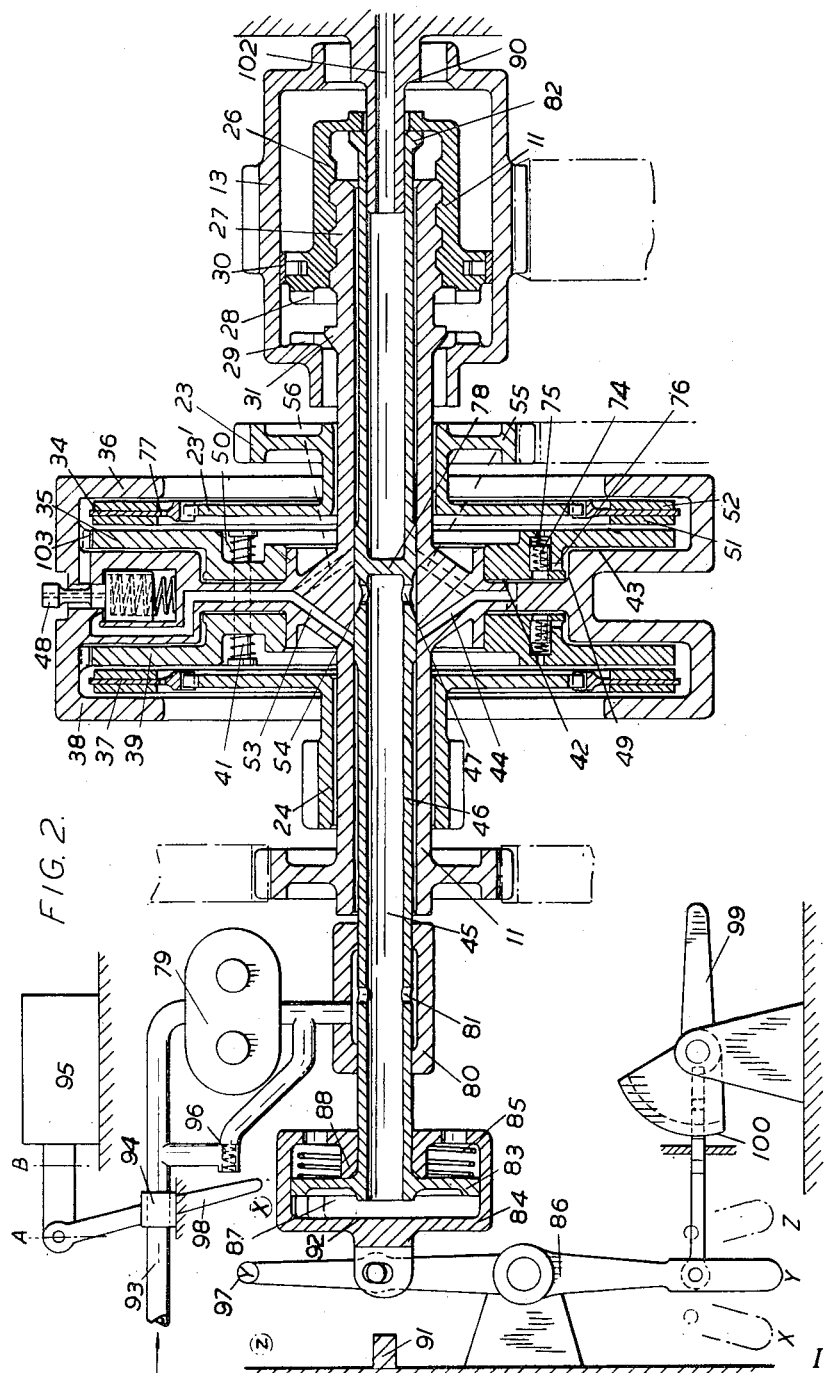

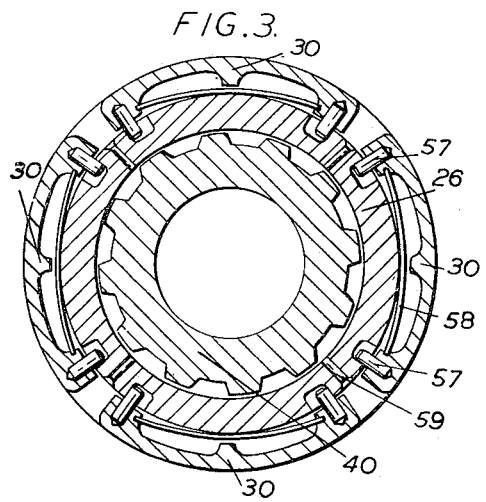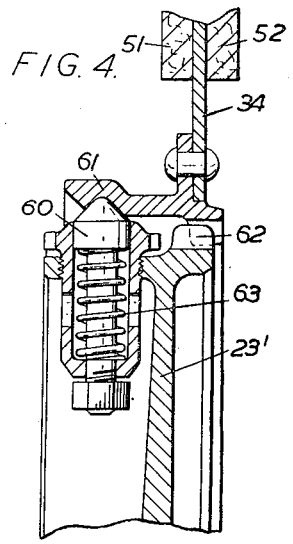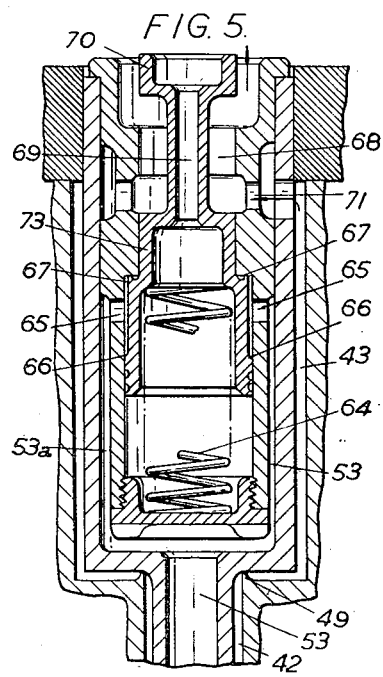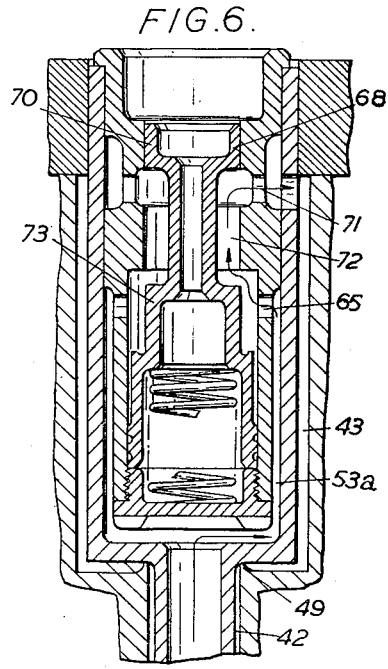

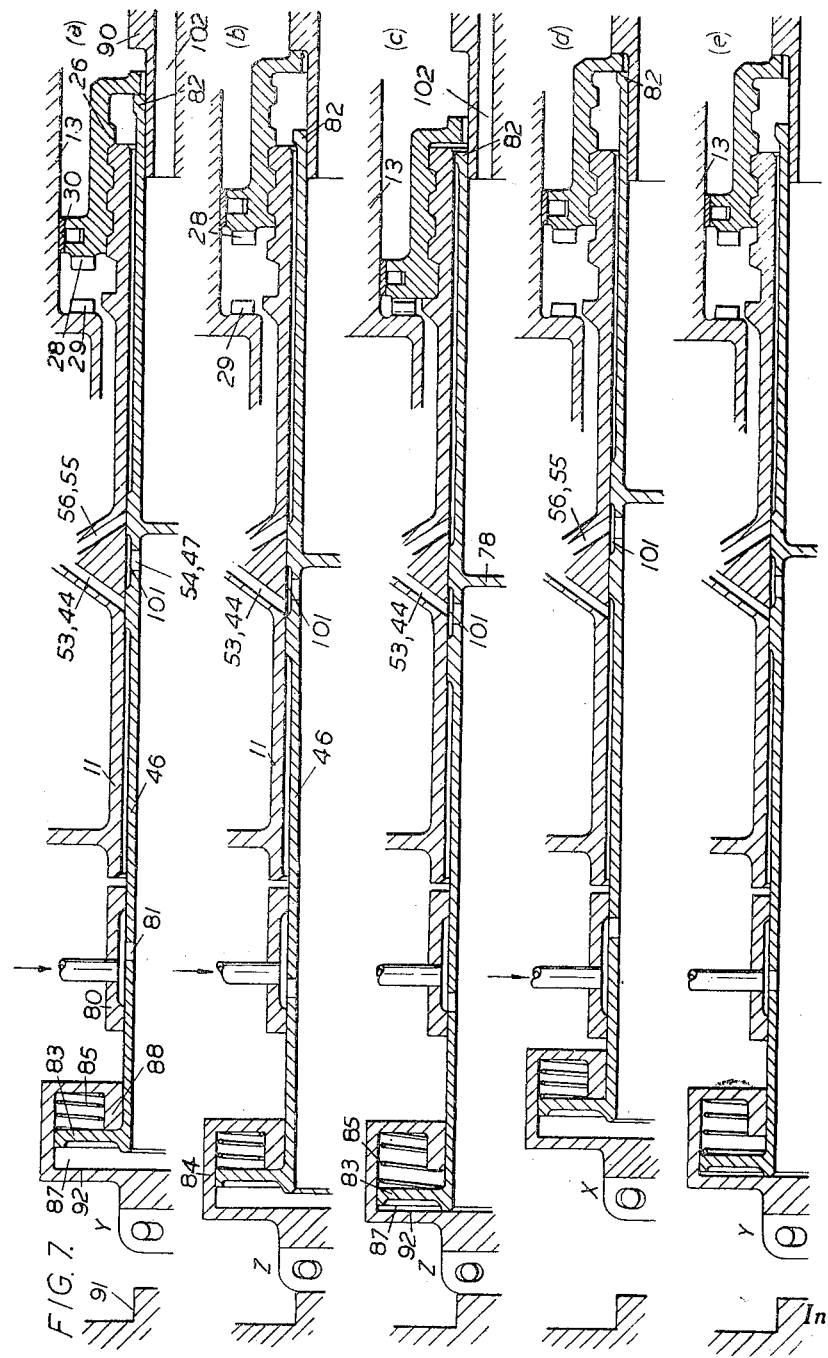

Patented Feb. 26, 1952

2,587,431

UNITED STATES PATENT OFFICE 2,587,431

POWER TRANSMISSION GEARING

Benjamin William Barlow, Sudbury, Wembley, and George Hamilton Murray, Pinner, England, assignors to D. Napier & Son Limited, London, England, a company of Great Britain Application June 12, 1950, Serial No. 167,503
In Great Britain November 4, 1949

12 Claims. (Cl. 74—336)

This invention relates to transmission gearing for transmitting power from an engine to a power absorber which requires a comparatively low driving torque at low speeds and a comparatively high driving torque at high speeds. An example of a power absorber of this kind is a marine screw propeller, and the invention is more particularly, although not exclusively, applicable for use in connection with a marine power plant.

According to the present invention a transmission gearing for the purpose specified comprises a driving element, a driven element, transmission gearing including a friction clutch by which limited torque can be transmitted from the driving element to the driven element, transmission gearing including a positive clutch by which torque can be transmitted from the driving element to the driven element at a ratio fractionally lower than the ratio of the gearing including a friction clutch, means for controlling the engagement of the friction clutch such that its engagement can only be effected when the driving element is rotating at comparatively low speed, means for automatically causing disengagement of the friction clutch when the speed of the driving element exceeds a predetermined value, and means whereby when upon such disengagement or slipping of the friction clutch the speed of the driven element relatively to that of the driving element drops to a value appropriate to the engagement of the positive clutch, the positive clutch is automatically engaged.

When the engine is rotating slowly and it is desired to connect it to the screw propeller or other power absorber, the friction clutch is first of all engaged, enabling the drive to be taken up smoothly. As the engine speed is increased, however, the torque which the gearing has to transmit will increase to a value which cannot safely be transmitted through a friction clutch of convenient size: Thus when the speed has attained a predetermined value the friction clutch is released, causing a reduction in the speed ratio between the driving element and the driven element sufficient to effect the automatic engagement of the positive clutch. The engine can now be run up to full speed, since the positive clutch is capable of carrying the full torque. As the ratio of the transmission gearing which includes the positive clutch is only fractionally lower than the ratio of the gearing which includes the friction clutch, the transition from the former gearing to the latter will occur quite smoothly.

When the engine speed is reduced below the aforementioned predetermined value, the friction clutch is re-engaged, thus causing a slight acceleration of the driven element in relation to the driving element sufficient to disengage the positive clutch.

The arrangement may be such that there is a neutral condition in which neither clutch is engaged.

The automatic engagement of the positive clutch may be effected by relative movement between two clutch members produced as a result of a frictional drag in the appropriate direction exerted on a part connected to one of the clutch members when the driven clutch member tends to rotate more slowly than the driving clutch member. Thus, the positive clutch may include engaging dog members one of which is rigidly connected to the driven element while the other is carried by a member engaging a quick-pitch screw thread on the driving element and carrying friction members which bear against a surface on the driven element, and stop mechanism for preventing engagement of the positive clutch when such engagement is not desired but the relative speeds of the driving and driven elements are conducive to such engagement. This stop mechanism is necessary, for example, if the transmission gearing embodies a reverse gear train.

In one form of the invention which embodies a reverse gear train the transmission gearing includes a second friction clutch and a train of gearing by which, when that clutch is engaged, torque is transmitted in the reverse direction from the driving to the driven member. Preferably means is provided for controlling the engagement of the second friction clutch such that its engagement can only be effected when the driving element is rotated at comparatively low speed.

The friction clutch or clutches can be operated in any suitable manner, but in one form of the invention they are hydraulically controlled and the means for automatically disengaging the friction clutch in the forward gearing when the speed of the driving shaft exceeds the predetermined value comprises governor mechanism for automatically reducing the supply of hydraulic fluid to the said friction clutch so that it disengages.

The invention may be carried into effect in various ways but one particular arrangement of transmission gearing embodying the invention and suitable for use with a marine power plant will be described by way of example, with reference to the accompanying drawings, in which:

Figure 1 is a diagrammatic perspective view of the gearing.

Figure 2 is a somewhat diagrammatic sectional elevation of the clutch unit shown in Figure 1, Figure 3 is a cross-sectional view of the free wheel assembly, Figure 4 is a sectional view of the locating device used to maintain the driven plate in the off position, Figure 5 is a sectional view of the escape valve in its exhaust position, Figure 6 is a sectional view of the escape valve in its closed position, and Figure 7 consists of a series of fragmentary sectional elevations of parts of the transmission gearing showing the relative positions which they occupy for engagement of various gears.

In the arrangement to be described the transmission gearing comprises a main forward or "ahead" gear train including a positive clutch, an auxiliary "ahead" gear train including a friction clutch, and a reverse or "astern" gear train including a second friction clutch.

Referring first to Figure 1 of the drawings, the main "ahead" drive is transmitted from the driving shaft 11 through to the propeller shaft 12 through divided transmission gearing. To this end the main "ahead" pinion 13 engages a pair of identical idler pinions 14 and 15 which in turn engage intermediate gears 16 and 17 each mounted at one end of separate quill shafts 18 and 19. Gears 20 and 21 on the other ends of the quill shafts engage a common final gear wheel 22 on the propeller shaft. Thus when the main "ahead" drive is engaged the propeller shaft rotates in the opposite direction to the driving shaft. The flexible quill shafts ensure an equal torque distribution through the two parts of the divided transmission gearing.

The driving shaft from the engine carries a main clutch member provided with two friction surfaces which can be selectively engaged by driven clutch plates splined to an auxiliary "ahead" pinion 23 and an "astern" pinion 24 respectively. The complete clutch unit is denoted by the reference numeral 25. The shaft 11 carries at its free end a quick pitch screwthread forming part of a positive clutch unit in the main "ahead" drive.

The positive clutch unit, which is best seen in Figures 2 and 3, comprises an internally threaded sleeve 26 which engages the quick pitch thread 27 on the driving shaft and which also carries axially extending dogs 28 at one end. This sleeve can slide axially within the hollow main "ahead" pinion 13, which also carries internal axially extending dogs 29 at one end. The latter dogs 29 can be engaged or disengaged by the dogs 28 on the sleeve, dependent on the axial position of the sleeve the main "ahead" pinion being constrained against axial movement. The sleeve carries four friction shoes 30 on its circumference which engage the cylindrical inner surface of the main "ahead" pinion. The four shoes 30 are mounted in an annular groove in the sleeve 26. Stop pins 57 prevent rotational movement of the shoes relative to the sleeve but permit free radial movement. Each shoe is pressed against the inner surface of the main "ahead" pinion 13 by a small leaf spring 58 mounted beneath the shoe. The shoes are lubricated by oil fed to their leading edges through holes 59. The arrangement is such that when the main "ahead" pinion 13 is revolving more slowly than the driving shaft 11, the frictional drag on the sleeve due to the friction shoes tends to rotate it about the driving shaft, and by reason of the quick pitch screwthread such rotation moves the sleeve axially until its dogs 28 engage the dogs 29 of the main "ahead" pinion, and so lock the pinion to the driving shaft. A stop or shoulder 31 is provided to limit the axial extent of the engagement and thus to prevent jamming, and also to prevent the axial thrust which results from transmitting the input torque via a thread from being transferred to the supporting bearings of the pinion 13. Conversely, when the main "ahead" pinion 13 is rotated faster than the driving shaft 11, the frictional drag on the sleeve causes it to move axially in the other direction and so to disengage the dogs. A stop mechanism for preventing engagement of the dogs when the "astern" gear train is engaged will be described below.

The auxiliary "ahead" pinion 23 is rotatable independently of the driving shaft, unless it is clutched thereto by means of the auxiliary drive friction clutch. As seen in Figure 1, the pinion 23 meshes with a second auxiliary pinion 32 coaxial with and secured to one of the idler pinions 14 in the main drive, and is thus permanently geared to the propeller shaft and to the main "ahead" pinion. The gear ratio between the auxiliary "ahead" pinion 23 and the second auxiliary "ahead" pinion 32 is fractionally higher than the ratio between the main "ahead" pinion 13 and the idler pinions 14 and 15, thus in one particular case the pinions 23 and 32 have thirty-five and forty-six teeth respectively while pinions 13 and 14 may have thirty-four and forty-seven teeth respectively, so that when the friction clutch in the auxiliary drive is engaged the main "ahead" pinion will be driven by its idler pinion at a speed somewhat in excess of that of the driving shaft, so that the positive clutch is disengaged. It will be appreciated that as the auxiliary "ahead" pinion 23 is positively connected to one of the idler wheels 14 in the main drive, the propeller shaft will be rotated in the same direction whether the auxiliary drive friction clutch or the positive clutch is engaged.

The "astern" pinion 24 is permanently connected to the final gear wheel 22 on the propeller shaft through an idler gear 33. Thus when the "astern" pinion is clutched to the driving shaft, the propeller shaft will be rotated in the opposite direction to that in which it is rotated when the positive clutch or the auxiliary drive friction clutch are engaged.

The clutch unit comprising the auxiliary drive friction clutch and the "astern" friction clutch is best seen in Figure 2.

The friction clutches are engaged by sandwiching their driven plates 34 and 37 between pressure plates 35 and 39 and the appropriate surfaces 36 and 38 respectively on the main clutch member. The main clutch member is integral with or secured to the driving shaft 11. Each pressure plate is arranged to be advanced independently by oil pressure behind it. The pressure plates of both friction clutches are connected together by spring-loaded through-bolts 41 which do not interfere with the advancement of one pressure plate at a time, but are suitably dimensioned to prevent both clutches being engaged simultaneously.

Each clutch is substantially identical and the decription of one will suffice for the other. Figure 2 shows the valves and oil passages used for the auxiliary drive clutch only, and the description following, where it refers to the auxiliary drive clutch alone, will also apply to the "astern" clutch, except where the context otherwise requires.

Normally when either clutch is out of action it is important that rubbing should not occur between any of the surfaces owing to the fact that the relative rotational speeds may be very high. To this end a number of "dimple" type locating devices are used as shown in Figure 4.

A plunger 60 is adapted to engage a smooth recess in a ring 61, which is secured to the driven plate 34. The plunger is mounted on a disc 23¹ which is rigidly secured to the auxiliary drive pinion 23 and is restrained from movement in an axial direction, while it is constrained to move at the same rotational speed as the driven plate 34 by reason of the engagement of the dogs and splines 62. Thus when the disc 23¹ is revolving, the plunger 60 is flung outwardly under the action of centrifugal forces assisted also by a spring 53, and tends to hold the driven plate in a predetermined central position between the pressure plate 35 and the surfaces 36. The spring is designed to exert quite a small restraining load and therefore at low speeds little force is required to move the driven plate over towards the surface 36 against the restraint of the plunger.

The rear of each pressure plate, and the part of the main clutch member with which it cooperates, are stepped so as to provide inner and outer annular chambers 42 and 43 respectively. A passage 44 in the main clutch member connects the inner chamber with a hollow bore 45 in the driving shaft. This bore houses an axially slidable valve tube 46 whereby, when a port 47 in the valve tube communicates with the passage 44, oil under pressure can be admitted to the inner annular chamber 42. When the clutch is disengaged, the outer annular chamber 43 is vented by means of an escape valve 48, and oil can also escape between the driven plate 34 and the pressure plate 35 or between the driven plate and the surface 36. Holes 77 in the plate 34 prevent oil being dammed up behind the plate.

The inner annular chamber 42 is provided on its inner circumference with a tolerably good oil seal, but the seal on its outer circumference consists only of a constriction afforded by a flange 49 on the pressure plate. The passage 44 may be formed as several separate parallel passages to obtain the necessary cross-sectional area, and is capable of delivering a large flow of oil, considerably in excess of the loss of oil past the flange 49, and a pressure is therefore built up in the inner chamber which may be of the order of 5–10 lbs./sq. in. In the particular construction described, this pressure introduces a load of about 500 lbs. between the main clutch member and the pressure plate 35, and at a load somewhat less than this the springs 59 on the through-bolts 41 are compressed and allow the pressure plate to slide axially away from the main clutch member and into contact with the friction surface 51 of the driven plate 34. The driven plate 34 then itself slides axially until its other surface 52 comes into contact with the surface 36.

The frictional engagement between the respective surfaces is slight, due to the relatively light pressure. Thus the drive is taken up smoothly, but only a very small torque can as yet be transmitted. At the same time, however, the oil under pressure passes from the hollow bore 45 through the passage 53 to the escape valve 48, and closes this valve, but nevertheless until the pressure plate actually makes contact with the driven plate, oil can still escape from the outer annular chamber between the plates. When, however, the driven plate is sandwiched between the pressure plate and the surface 36 of the main clutch member, this escape of oil is also stopped. Pressure is therefore built up in the outer annular chamber 43 as well, thus considerably increasing the force with which the driven plate is gripped.

Relative rotation between the pressure plate and the main clutch member is permanently prevented by the engagement of dogs and internal splines 103. The friction clutch is now in a condition to transmit an increased torque from the engine to the propeller, but nevertheless it is not capable of transmitting the torque necessary to drive the propeller at more than a fairly low speed.

Oil is supplied to the clutch unit for the operation of the auxiliary drive clutch whenever the valve tube 46 is moved axially to a position where its ports 47 and 54 register with the passages 44 and 53. Similarly the "astern" clutch will be brought into operation whenever the valve tube is moved axially to a position where the ports 47 and 54 register with the passages 55 and 56, which are shown dotted and which correspond to the passages 44 and 53 of the "ahead" friction clutch. Thus by moving the valve tube along the shaft the oil under pressure can be admitted to one friction clutch at a time as required. The entrances to the passages 55 and 56 are axially spaced from the entrances to the passages 44 and 53 by a distance greater than the effective axial length of the ports 47 and 54 so that the oil under pressure cannot be admitted simultaneously to both clutches.

The escape valve 48 for venting the outer annular chamber 43 and releasing the friction clutch is shown in detail in Figures 5 and 6. The valve is biassed towards its open position shown in Figure 5 by a spring 64, and is closed by oil pressure only when this pressure exceeds a predetermined value. Since the valve is mounted in and rotates with the main clutch member it is necessary to compensate it against centrifugal effects. This is done by ensuring that the centrifugal effects on the oil in the passage 53 leading to the valve exactly balance the centrifugal effects on the moving parts of the valve, so that its operation is dependent only on the pressure of the oil in the valve tube 46 housed within the driving shaft 11, and is independent of the speed at which the driving shaft and main clutch member are rotating.

When no oil pressure is present in the tube 46, nor hence in the passage 53, the valve adopts the position shown in Figure 5. In this position oil from the passages 53a can go no further than the ports 65. Oil in the inner annular chamber 42, as stated above can slowly escape past the flange 49 into the outer annular chamber 43. The outer annular chamber, together with the space in the proximity of the driven plate 34 is however open to the interior of the gear box via the port 71 and the annular port 68 surrounding the neck 69 of the escape valve. Thus there can be no effective oil pressure in any of the operative parts of the clutch.

When pressure is applied to the oil in the passage 53 as the result of an appropriate movement of the valve tube 46, this supplements the pressure at the ports 65 due to centrifugal effects on the oil in the passage, and when this total applied pressure is built up to, say, 10–15 lbs./sq. in. it is able to exert sufficient thrust on the annular area 66 to force the valve inwards. Immediately the valve begins to move, the annular area 67 also becomes exposed to the oil pressure and the thrust is increased, and the valve is moved into the closed position shown in Figure 6.

In this position the port 68 is closed by the head 70 of the escape valve. Oil from the passage 53a is now free to pass through port 65 and the annular port 72, which was previously closed by a cylindrical formation 73, out of the port 71 into the outer annular chamber 43 and the associated spaces adjacent to the driven plate 34. At the same time oil is under pressure in the inner annular chamber 42 and is leaking past the flange 49 into the outer chamber 43, while the pressure plate 35 is forced across into contact with the driven plate 34, as described above, closing the gaps between the clutch surfaces and building up an effective oil seal. When however the pressure in the inner annular chamber 42 exceeds a predetermined value, say 7-12 lbs./sq. in., by-pass valves 74, shown in Figure 2, are opened against the pressure of their springs 75 and oil is by-passed around the constriction afforded by the flange 49, through the passage 76. Thus the filling of the outer annular chamber is greatly accelerated as soon as the pressure plate 35 has moved across full distance.

Eventually both the inner and outer annular chambers are full of oil, the pressure of which therefore acts over the whole side area of these chambers. The applied oil pressure may rise to, say, about 100 lbs./sq. in. and this pressure together with the cumulative centrifugal oil pressure rapidly and firmly engages the clutch members.

Disengagement of the clutch is brought about by releasing the applied oil pressure, as described later.

The valve tube 46 consists of an axially movable tube extending through the hollow interior of the driving shaft 11, and having a transverse partition 78 in the vicinity of the main clutch member. The bore of this tube to the lefthand side of the partition as shown in Figure 2 is in communication with an oil pump 79 or other source of oil under pressure, through a suitable glanded sleeve 80 and ports 81 in the wall of the valve tube. The wall of the valve tube adjacent to the pressure side of the partition is furnished with the ports 54 and 47 already referred to above, which are adapted to register selectively with the passages 53 and 44, or with 56 and 55, or with neither, depending on the axial position of the valve tube. The end 82 of the valve tube on the side remote from the pressure system can, in certain axial positions of the valve tube, make contact with the sleeve 26 of the positive clutch, and so constitute the stop mechanism referred to above.

The lefthand end of the valve tube, as shown in Figure 2, carries a piston 83 which lies in a cylinder 84 which is in turn carried by and is movable with a transmission control lever 86. This end of the valve tube is open, so that the space 87 is subject to the pressure of the oil supply. When the oil is under pressure the piston is pressed hard up against a stop 88, and when the oil pressure is relieved a spring 85 urges the piston into contact with the end wall 92 of the cylinder. In this way certain movements can be imparted to the valve tube independently of the transmission control lever by applying or relieving the oil pressure.

The oil is supplied to the valve tube by the pump 79 and is drawn from a tube 93 through a valve 94 which is controlled by the governor 95.

In the position A of the governor, as shown in Figure 2, the valve is open, and this occurs only when the engine is idling. At all higher speeds, in "ahead" gear, the governor adopts the position B, and the valve 94 is closed thereby shutting off the supply of oil under pressure to the valve tube 46. When however the transmission control lever 86 is in the position X as shown in Figure 2, which is the position for "astern" drive, an interlock 97 on the end of the lever engages with the protruding lever 98 of the governor-controlled valve 94 and holds this valve open at all speeds. The spring-loaded relief valve 96 opens whenever the oil pump 79 is pumping against high resistance or a closed oil circuit, and affords a by-pass relief circuit for the oil.

To ensure that no gear changes are attempted at any engine speeds higher than idling, the transmission control lever 86 and the engine speed control 99 are provided with an interlocking device 100, which permits movement of the transmission control lever only when the engine control 99 is in the position for idling speed.

The various operations of gear changing will now be described with reference to Figure 7, which comprises a series (a) to (e) of fragmentary longitudinal sections of the valve tube 46 and associated parts, in different positions.

Figure 7 (a) shows the gearing in the "neutral" position of Figure 2 with the engine running at its idling speed. Oil is being delivered under pressure into the glanded sleeve 80 and via the port 81 into the hollow interior of the valve tube 46. The cylinder space 87 is subject to this oil pressure and thus the piston 83 is held hard against the stop 88. In the central or "neutral" position Y of the transmission control lever this ensures that the stop end 82 of the valve tube 46 protrudes beyond the corresponding end of the driving shaft 11, and serves to hold the positive clutch sleeve 26 in a position where the dogs 28 and 29 are out of engagement. It should be noted that even if the oil supply should fail for any reason in this neutral position, and the valve tube should slide axially towards the end wall 92 of the cylinder 84, the stop end 82 of the valve tube will still protrude sufficiently to prevent the dogs 28 of the sleeve 26 from engaging with the dogs 29 on the main "ahead" pinion 13. In this position the ports 54 and 47 communicating with the annular gallery 101 do not co-operate with any of the passages 44, 53, 55 and 56 leading to the friction clutches, so that both clutches are disengaged. Thus no drive can be transmitted from the driving shaft to the propeller shaft.

When the transmission control lever is moved into the "ahead" position Z as shown in Figure 7 (b), which can only occur when the engine control 99 is set for idling speed, it carries with it the cylinder 84 and the valve tube 46, retracting the stop end 82 to a certain extent into the end of the driving shaft 11, but still not sufficiently to enable the dogs 28 and 29 of the positive clutch to engage. This movement of the valve tube brings the annular oil gallery 101 into register with the passages 53 and 44 leading to the auxiliary drive friction clutch. This clutch will therefore engage in the manner described above, so that a limited torque will be transmitted from the driving shaft to the propeller through the auxiliary gear train.

When the engine speed control is advanced a condition is reached in which the engine speed is high enough for the governor to cut off the supply of oil. When this occurs two things automatically happen as shown in Figure 7 (c). In the first place, the pressure is relieved in the space 87, and the piston 83 is pushed against the end wall 92 by the spring 85, thus retracting the stop end 82 even further and freeing the positive clutch for axial movement so that the dogs can engage when the relative speeds of the driving and driven shafts are appropriate. In retracting the valve tube the spring 85 is aided by the pressure of lubricating oil supplied through a passage 102, which oil fills the valve tube as far as the partition 78. In the second place, the drop of oil pressure allows the escape valve 48 to move into its open position, and oil will be exhausted from the annular chambers of the auxiliary drive friction clutch allowing this clutch to disengage. As soon as the disengagement begins, the clutch slips, allowing the speed of the propeller shaft to fall in relation to the speed of the driving shaft. When this occurs the main "ahead" pinion 13 begins to lag behind the driving shaft, and so the positive clutch engages. Thus the drive is now transmitted through the positive clutch and the main "ahead" gear train, the positive clutch being strong enough to take the full torque.

When the engine speed control is brought back to the low speed position the auxiliary drive friction clutch will be re-engaged and the positive clutch disengaged by a reversal of the operations just described.

The transmission control lever can now be moved again into the "neutral" position Y, or through this position into the "astern" position X shown in Figure 7 (d). In this position the governor-controlled valve 94 is prevented from closing, as described above. The stop end 82 of the valve tube is projected still further from the driving shaft, so that it holds the positive clutch out of engagement. The movement of the valve tube also brings the annular gallery 101 into register with the passages 56 and 55 leading to the "astern" friction clutch. This clutch is accoridngly engaged in the same manner as the auxiliary drive friction clutch described above, and the drive is transmitted to the propeller through the "astern" gear train. In view of the fact that the torque which the "astern" friction clutch can transmit is limited, means is provided for limiting the engine speed when "astern" is engaged. Neverthless the maximum engine speed permitted with the "astern" clutch engaged will be greater than that permitted when the "ahead" friction clutch is engaged, in order to obtain a reasonable "astern" performance. If necessary the "astern" friction clutch may be of more robust construction than the "ahead" friction clutch.

If the oil supply should fail it is impossible to obtain an "astern" drive since the "astern" clutch is oil-operated. It is possible, however, to start the engine in neutral since the positive clutch will still be held out of engagement, and by moving the transmission control lever to the "ahead" position the positive clutch will be engaged without the intermediate engagement of the auxiliary drive friction clutch.

Under trailing conditions, as shown in Figure 7 (c), that is to say when the vessel is being drawn through the water and the propeller is imparting a torque to the propeller shaft, the valve tube is held in the "neutral" position, there is no supply of pressure oil, the driving shaft is stationary, and as the main "ahead" pinion 13 is being driven forwards the positive clutch will be fully disengaged. Similarly if the engine stops due to a seizure, or the like, the positive clutch disengages itself and prevents the inertia of the propeller and shaft, or other influences, from damaging the transmission.

Auxiliary lubricating means is preferably provided for lubricating the gearing under trailing conditions, since the usual engine driven lubricating system will be inoperative.

What we claim as our invention and desire to secure by Letters Patent is:

1. Transmission gearing for transmitting power from an engine to a power absorber which requires a comparatively low driving torque at low speeds and a comparatively high driving torque at high speeds, comprising a driving element, a driven element, a main gear train connecting said driving and driven elements, an auxiliary gear train connecting said driving and driven elements at a speed ratio fractionally higher than the speed ratio of said main gear train, a friction clutch in said auxiliary gear train which is capable of transmitting only a fraction of the full load torque, a positive clutch in said main gear train which is capable of transmitting the full load torque, governor means responsive to the speed of said driving element for controlling the operation of said friction clutch and adapted to permit engagement thereof only when said driving element is rotating below a predetermined speed and to cause disengagement thereof when said predetermined speed is exceeded, and means responsive to the difference in speed of said driven element and said driving element for controlling the engagement of the positive clutch and adapted to effect engagement of said positive clutch only upon disengagement or slipping of said friction clutch.

2. Transmission gearing for transmitting power from an engine to a power absorber which requires a comparatively low driving torque at low speeds and a comparatively high driving torque at high speeds, comprising a driving element, a driven element, a main gear train connecting said driving and driven elements, an auxiliary gear train connecting said driving and driven elements at a speed ratio fractionally higher than the speed ratio of said main gear train, a frictional clutch in said auxiliary gear train which is capable of transmitting only a fraction of the full load torque, a positive clutch in said main gear train which is capable of transmitting full load torque, governor means responsive to the speed of said driving element for controlling the operation of said friction clutch and adapted to permit engagement thereof only when said driving element is rotating below a predetermined speed and to cause disengagement thereof when said predetermined speed is exceeded, said positive clutch comprising a driving clutch member connected to said driving element, a driven clutch member operatively connected to said driven element, a frictional drag member mounted on one of said clutch members and frictionally engaging the other of said clutch members, and a quick pitch screw thread member on which one of said clutch members is mounted whereby the clutch members are brought into positive engagement when the driven clutch member is rotated more slowly than the driving clutch member, and whereby the clutch members are disengaged when the driven clutch member overruns the driving clutch member.

3. Transmission gearing as claimed in claim 2, in which there is a stop member associated with the positive clutch, and operating means for bringing said stop member into a position for preventing engagement of the positive clutch when such engagement is not required but the relative speeds of the driving and driven clutch members are conducive to such engagement.

4. Transmission gearing as claimed in claim 3, in which there is a reverse gear train connecting the driving element to the driven element, a clutch in said reverse gear train, a control member for actuating said clutch in the reverse gear train, and an operative connection between said control member and the stop member associated with the positive clutch in the main gear train, adapted to prevent engagement of said positive clutch whenever said clutch in the reverse gear train is engaged.

5. Transmission gearing as claimed in claim 1, in which there is hydraulic actuating means for the friction clutch in the auxiliary gear train, a valve for controlling the hydraulic pressure fluid supply to said hydraulic actuating means, and an operative connection between said valve and the governor means responsive to the speed of the driving element adapted to close said valve when the driving element is rotating at above a predetermined speed.

6. Transmission gearing as claimed in claim 5, in which there is at least one pressure actuated escape valve associated with the hydraulically actuated friction clutch in the auxiliary gear train, said escape valve being adapted to open to release hydraulic fluid when the pressure thereof falls below a predetermined value.

7. Transmission gearing as claimed in claim 6, in which said escape valve is mounted on a rotating part of said friction clutch, and moving parts of said valve and the hydraulic fluid in said rotating part and acting on said moving parts are balanced as regards centrifugal force due to the rotation of the clutch, whereby the operation of the valve is dependent solely upon the applied hydraulic pressure.

8. Transmission gearing as claimed in claim 1, in which there is a reverse gear train connecting the driving element to the driven element, a clutch in said reverse gear train, a control member for actuating said clutch, a speed control for said engine, and an interlock between said speed control and said control member whereby said control member can only be moved to engage or disengage said clutch when said speed control is set for a relatively low engine speed.

9. Transmission gearing as claimed in claim 8, in which the clutch in said reverse gear train is a friction clutch and in which hydraulic actuating means is provided therefor.

10. Transmission bearing as claimed in claim 9, in which there is at least one pressure actuated escape valve associated with the hydraulically actuated friction clutch in the reverse gear train, said escape valve being adapted to open to release hydraulic fluid when the pressure thereof falls below a predetermined value.

11. Transmission gearing as claimed in claim 10, in which said escape valve is mounted on a rotating part of said friction clutch, and moving parts of said valve and the hydraulic fluid in said rotating part and acting on said moving parts are balanced as regards centrifugal forces due to the rotation of the clutch, whereby the operation of the valve is dependent solely upon the applied hydraulic pressure.

12. Transmission gearing as claimed in claim 1, in which there is a reverse gear train connecting the driving element to the driven element, a friction clutch in said reverse gear train, hydraulic actuating means for the friction clutches in the auxiliary and reverse gear trains, a control member for selectively engaging said friction clutches, a valve for controlling the supply of hydraulic pressure fluid to said hydraulic actuating means, an operative connection between said valve and the governor means responsive to the speed of the driving element adapted to close said valve when the driving element is rotating at above a predetermined speed, and means associated with said control member for overriding the action of the governor means and maintaining the supply of hydraulic pressure fluid when said friction clutch in the reverse gear train is engaged.

BENJAMIN WILLIAM BARLOW.
GEORGE HAMILTON MURRAY.

REFERENCES CITED

The following references are of record in the file of this patent:

UNITED STATES PATENTS

| Number | Name | Date |
| --- | --- | --- |
| 1,471,228 | Williams | Oct. 16, 1923 |
| 2,164,884 | Nenninger et al. | July 4, 1939 |
| 2,241,861 | Lang | May 13, 1941 |